(12) United States Patent
Hafeez

(10) Patent No.: US 12,213,118 B2
(45) Date of Patent: *Jan. 28, 2025

(54) CHANNEL ALLOCATION BASED ON ADJACENT CHANNEL INTERFERENCE

(71) Applicant: Charter Communications Operating, LLC, St. Louis, MO (US)

(72) Inventor: Abdulrauf Hafeez, Cary, NC (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,347

(22) Filed: May 4, 2023

(65) Prior Publication Data

US 2023/0276417 A1    Aug. 31, 2023

Related U.S. Application Data

(63) Continuation of application No. 16/874,541, filed on May 14, 2020, now Pat. No. 11,659,533.

(51) Int. Cl.
*H04W 72/0453*    (2023.01)
*H04B 17/345*    (2015.01)
*H04W 72/541*    (2023.01)

(52) U.S. Cl.
CPC ...... *H04W 72/0453* (2013.01); *H04B 17/345* (2015.01); *H04W 72/541* (2023.01)

(58) Field of Classification Search
CPC ............ H04W 72/0453; H04W 72/541; H04B 17/345; H04B 17/354; H04B 2001/1045; H04L 5/0073; H04L 27/0006
See application file for complete search history.

(56) References Cited

U.S. PATENT DOCUMENTS 10,681,560 B1 *    6/2020  Sevindik ............... H04W 16/14
2011/0086663 A1    4/2011  Gorokhov et al.
(Continued)

OTHER PUBLICATIONS

CBRS Coexistence Technical Specifciations, CBRSA-TS-2001, V3.0.0, Feb. 18, 2020, pp. 1-35.
Wireless Innovation Forum, Operations for Citizens Broadband Radio Service (CBRS): Gaa Spectrum Coordination—Approach 2, Document WINNF-TR-2004, Version V1.0.0, May 16, 2019, pp. 1-20.
(Continued)

*Primary Examiner* — Ricky Q Ngo
*Assistant Examiner* — Kabir U Jahangir
(74) *Attorney, Agent, or Firm* — Armis IP Law, LLC

(57) ABSTRACT

A communication management resource receives input indicating presence of a pair of wireless stations including a first wireless station and a second wireless station in a network environment. Based on a determined amount of adjacent channel interference between the first wireless station and the second wireless station, the communication management resource generates an adjacent channel interference value. The communication management resource assigns the adjacent channel interference value to the pair of wireless stations. The adjacent channel interference value indicates an estimate of adjacent channel interference between the first wireless station and the second wireless station. In a network of wireless stations, the adjacent channel interference value is used as a basis to identify pairs of wireless stations that are susceptible to adjacent channel interference. A wireless channel allocation management resource uses the adjacent channel interference information to allocate wireless channels for use by wireless stations to reduce adjacent channel interference.

27 Claims, 12 Drawing Sheets

1200

RECEIVE INPUT INDICATING PRESENCE OF A PAIR OF WIRELESS STATIONS INCLUDING A FIRST WIRELESS STATION AND A SECOND WIRELESS STATION IN A NETWORK ENVIRONMENT — 1210

GENERATE AN ADJACENT CHANNEL INTERFERENCE VALUE BASED ON A DETERMINED AMOUNT OF ADJACENT CHANNEL INTERFERENCE BETWEEN THE FIRST WIRELESS STATION AND THE SECOND WIRELESS STATION — 1220

ASSIGN THE ADJACENT CHANNEL INTERFERENCE VALUE TO THE PAIR OF WIRELESS STATIONS, THE ADJACENT CHANNEL INTERFERENCE VALUE INDICATING AN ESTIMATE OF ADJACENT CHANNEL INTERFERENCE BETWEEN THE FIRST WIRELESS STATION AND THE SECOND WIRELESS STATION — 1230

(56) References Cited

U.S. PATENT DOCUMENTS

| | | |
|---|---|---|
| 2011/0182338 A1 | 7/2011 | Li et al. |
| 2014/0086139 A1* | 3/2014 | Kang .................. H04W 72/541 |
| | | 370/315 |
| 2018/0279316 A1 | 9/2018 | Mueck et al. |
| 2019/0044614 A1 | 2/2019 | Khoshnevisan et al. |
| 2019/0141713 A1 | 5/2019 | Cimpu et al. |
| 2019/0335336 A1 | 10/2019 | Cimpu et al. |
| 2019/0373615 A1 | 12/2019 | Cimpu et al. |
| 2020/0053569 A1* | 2/2020 | Hannan ................. H04W 24/10 |
| 2020/0245152 A1 | 7/2020 | Guo et al. |
| 2020/0396624 A1 | 12/2020 | Sevindik et al. |
| 2021/0006342 A1 | 1/2021 | Zhao et al. |
| 2021/0258133 A1 | 8/2021 | Raghavan et al. |
| 2021/0345352 A1* | 11/2021 | Zhao .................... H04W 24/02 |

OTHER PUBLICATIONS

Wireless Information Forum, Operations for Citizens Broadband Radio Service (CBRS); "Gaa Spectrum Coordination—Approach 1", Technical Report, Document WINNF-TR-2003, Version V1.0.0 , May 31, 2019, pp. 1-25, The Software Defined Radio Forum, Inc.

Wireless Innovation Forum, Operations for Citizens Broadband Radio Service (CBRS); GAA Spectrum Coordination (GSC), Technical Report-Approach 3, Document WINNF-TR-2005, Version 1.0.0, May 16, 2019, pp. 1-15.

Wireless Innovation Forum, Operations for Citizens Broadband Radio Service (CBRS); GAA Spectrum Coordination—Approach 1 Technical Report, Document WINNF-TR-2003, Version V1.0.0, May 31, 2019, pp. 1-25.

\* cited by examiner

CHANNEL ALLOCATION BASED ON ADJACENT CHANNEL INTERFERENCE

RELATED APPLICATION

This application is a continuation application of earlier filed U.S. patent application Ser. No. 16/874,541 entitled "CHANNEL ALLOCATION BASED ON ADJACENT CHANNEL INTERFERENCE,", filed on May 14, 2020, the entire teachings of which are incorporated herein by this reference.

BACKGROUND

Conventional wireless networks typically include one or more wireless base stations to provide mobile communication devices access to a remote network such as the Internet.

One type of wireless base station is a so-called CBSD (Citizen Broadband Radio Service Device). Such a device uses a wireless channel allocated from a CBRS (Citizens Band Radio Service) band to support communications with one or more mobile communication devices.

The Citizens Broadband Radio Service (CBRS) band is shared among three tiers of users (incumbent users, priority access license users, and general authorized users) with the higher tiers being protected from interference from the lower tiers. For example, incumbents are entities such as US military and grandfather fixed satellite service users. Priority access license (PAL) users are entities such as operators who purchase spectrum licenses. General authorized access (GAA) users use the CBRS band without a license when bandwidth is available.

Typically, a so-called SAS (Spectrum Access Service) in a CBRS network allocates one or more wireless channels to a CBSD (such as a wireless base station) to support communications with respective user equipment such as one or more mobile communication devices. Each wireless station can be configured to communicate with the SAS to receive notification of the one or more wireless channels allocated for its use. Controlled allocation of wireless channels by the spectrum access system helps to prevent interference and increase spectrum use.

In general, interference in the CBRS spectrum is managed among users such that: i) PAL users are protected from each other and GAA users, ii) and GAA users are not protected but a coexistence manager (CxM) manages interference among them. Interference protection and management is done to avoid co-channel interference (CCI) only. Co-channel interference refers to interference caused by one wireless station to another wireless station both using the same carrier frequency.

Adjacent channel interference refers to interference caused by one wireless station to another wireless station when each of the wireless stations communicates using a different carrier frequency. According to conventional techniques, adjacent channel interference (ACI) is only controlled by means of required Spectrum Emissions Masks (SEMs) for CBSDs and EUDs (End User Devices).

BRIEF DESCRIPTION OF EMBODIMENTS

There are deficiencies associated with conventional techniques of allocating use of wireless channels in a network environment. For example, conventional allocation of channels in a wireless network environment is prone to adjacent channel interference (ACI). As a specific example, ACI can have a significant impact on PAL and GAA users in a hierarchical channel allocation system, especially when users' cells are not transmitting in the same direction at a given instant. This results in out of band emissions (OOBE) and blocking problems due to non-ideal transmitters and receivers at CBSDs and their associated EUDs.

It is noted that a common TDD (Time Division Duplex) configuration and frame synchronization can be implemented by users to minimize the occurrence of adjacent channel interference. However, this solution has several limitations. For example, certain wireless users are not governed by the rules set forth by an industry alliance, such as CBRS Alliance, and therefore may cause and suffer from significant interference. In some scenarios achieving frame synchronization, based on 3GPP requirements may be problematic. In yet further cases, forcing the same TDD configuration may be too restrictive to the different entities sharing a wireless spectrum. Additionally, only two TDD configurations have been standardized so far which do not cover all use cases, e.g., heavy uplink use. Yet further, if different TDD configurations are implemented in a wireless network, then multiple coexistence groups have to be created, resulting in less frequency reuse.

Embodiments herein provide novel ways of providing improved allocation and use of wireless channels amongst different entities sharing use of spectrum in a wireless network environment.

More specifically, according to one example embodiment, a communication management resource receives input indicating presence of a pair of wireless stations including a first wireless station and a second wireless station in a network environment. Based on a determined amount of adjacent channel interference between the first wireless station and the second wireless station, the communication management resource generates an adjacent channel interference value. In one embodiment, this is in addition to a co-channel interference value generated for the wireless station pair. The communication management resource assigns the adjacent channel interference value to the pair of wireless stations. As its name suggests, in one embodiment, the adjacent channel interference value indicates or is based on an estimate of adjacent channel interference between the first wireless station and the second wireless station.

The adjacent channel interference value can be any numerical value indicating a degree to which communications associated with the pair of first wireless station and the second wireless station are susceptible to adjacent channel interference. Embodiments herein include being proactive about identifying pairs of wireless stations susceptible to adjacent channel interference and assigning wireless channels to the pair one or more wireless stations such that the adjacent channel interference does not negatively impact wireless communications associated with the two wireless stations. A wireless channel manager allocates wireless channels based on the determined adjacent channel interference for pairs of wireless stations.

If desired, the adjacent channel interference value can be simply a logic one or logic zero, or other suitable value, indicating whether a so-called (adjacent channel interference) edge exists or not. In one embodiment, logic one indicates that a so-called edge (moderate to high susceptibility to adjacent channel interference) exists between the first wireless station and the second wireless station. Logic zero indicates that no edge exists (low or zero susceptibility to occurrence of adjacent channel interference). Accordingly, some pairs of wireless stations are flagged as being susceptible to adjacent channel interference, others are not flagged as being susceptible to adjacent channel interference.

Additionally, or alternatively, the different wireless station pairs are assigned a numerical value indicating a degree to which the pair is susceptible to adjacent channel interference.

In yet further example embodiments, assignment of the adjacent channel interference value to the pair of wireless stations indicates that first communications over a first wireless channel by the first wireless station and second communications over the second wireless channel by the second wireless station results in interference above a threshold value to either or both of the first wireless station and second wireless station, the second wireless channel being adjacent to the first wireless channel. In accordance with further example embodiments, the second wireless channel is any wireless channel other than the first wireless channel.

Further embodiments herein, via the communication management resource, selecting allocation of wireless channels to the first wireless station and the second wireless station based at least in part on an amount of the adjacent channel interference (as indicated by the adjacent channel interference value) associated with the pair. The communication management resource chooses a bandwidth spacing between the first wireless channel and the second wireless channel based on the adjacent channel interference value.

For example, assume that wireless channel 1, wireless channel 2, and wireless channel 3 are contiguous bands. The communication management resource allocates channel 1 and channel 3 to nearby wireless stations to reduce or eliminate adjacent channel interference. In one embodiment, the frequency spacing (wireless channel 2 not used) acts as a guard band between the wireless channels allocated to the first wireless station and the second wireless station.

In still further example embodiments, the first wireless station and the second wireless station are members of a group of wireless stations in a wireless network environment. The communication management resource assigns wireless channels to the multiple wireless stations along with supplemental wireless channels to accommodate frequency spacings amongst the first wireless station and the second wireless station.

Note that the adjacent channel interference can be determined such as estimated, calculated, etc., in any suitable manner. For example, in one embodiment, the communication management resource implements or uses one or more of an attenuation pathloss model, antenna models associated with the wireless transmitter/receiver of the first wireless station, antenna models associated with the wireless transmitter/receiver of the first wireless station, etc., to calculate the amount of adjacent channel interference between two wireless stations.

Additionally, or alternatively, the communication management resource can be configured to use actual test/historical data of testing implemented in the field to determine an amount of adjacent channel interference associated with the respective pair of wireless stations.

In accordance with further example embodiments, when allocating one or more wireless channels to the first wireless station and the second wireless station, the communication management resource: determines a frequency spacing value associated with the adjacent channel interference value assigned to a pair or set of wireless stations; selects a first wireless channel and a second wireless channel in response to determining that the first wireless channel and the second wireless channel are spaced apart by more than the determined frequency spacing; allocates the first wireless channel for use by the first wireless station; and allocates the second wireless channel for use by the second wireless station. As previously discussed, adjacent channel interference is avoided due to the frequency spacing.

Further embodiments herein include, via the communication management resource, in response to detecting that the first wireless station and the second wireless station (operating in the same vicinity) are time-division duplex frame-synchronized, calculating the amount of adjacent channel interference between the first wireless station and the second wireless station based on subframes and special subframe symbols from the first wireless station that overlap with subframes and special subframe symbols from the second wireless station in opposite duplex direction (i.e., uplink in first wireless station vs downlink in second wireless station or downlink in first wireless station and uplink in second wireless station).

In still further example embodiments, the communication management resource determines the amount of adjacent channel interference between the first wireless station and the second wireless station via operations of: via a model, producing an adjacent channel interference metric representing adjacent channel interference between the first wireless station and the second wireless station; and multiplying the adjacent channel interference metric by a scale factor, a magnitude of the scale factor depending on an overlap of transmission frames associated with the first wireless station and the second wireless station.

In still further example embodiments, the first wireless station and the second wireless station are members of a group of wireless stations present in a wireless network environment. The communication management resource assigns the multiple wireless stations supplemental wireless channels to provide a guard band as previously discussed. For example, in one embodiment, the communication management resource assigns the group of wireless stations a supplemental wireless channel to accommodate frequency spacing amongst the first wireless station and the second wireless station.

Note that the wireless stations can be any suitable type of communication devices. For example, in one embodiment, the first wireless station is a first mobile communication device; the second wireless station is a second mobile communication device. The communication management resource determines adjacent channel interference based on worst case adjacent channel interference caused by the wireless stations to each other.

Alternatively, the first wireless station is a first wireless base station providing first mobile communication devices access to a remote network; and the second wireless station is a second wireless base station providing second mobile communication devices access to the remote network.

In yet further embodiments, the adjacent channel interference value is based on a combination of: i) first adjacent channel interference caused by the wireless station (such as a first mobile communication device or wireless base station) wirelessly transmitting while the second wireless station (such as second mobile communication device or wireless base station) is wirelessly receiving, and ii) second adjacent channel interference caused by the second wireless station wirelessly transmitting while the first wireless station is wirelessly receiving. In one embodiment, the adjacent channel interference value assigned to the pair of first wireless station and the second wireless station is set to the greater of the first adjacent channel interference and the second adjacent channel interference.

The wireless stations as described herein can be operated in any suitable wireless network environment via any suitable one or more wireless communication protocols. In one nonlimiting example embodiment, the adjacent channel interference value assigned to the pair of first wireless station and the second wireless station is based on a combination of CBSD (Citizens Broadband radio Service Device) coordination and EUD (End User Device) coordination as further discussed herein. In yet further example embodiments, the determination of the adjacent channel interference value is based on channel bandwidth usage by the wireless stations.

Further embodiments herein include, via the communication management resource, marking a so-called edge between the first wireless station and the second wireless station as being susceptible to adjacent channel interference in response to determining that the adjacent channel interference value associated with the pair of wireless stations is greater than a threshold value.

In accordance with further example embodiments, an allocation management resource (such as one or more spectrum access systems/Coexistence Managers, considered individually or combined) detects an operational mode of one or more wireless stations in the wireless network environment. Assume that the allocation management resource detects that a one or more pairs of wireless stations in the wireless network environment do not implement frame synchronization or lack a common TDD (Time Domain Duplex) configuration. In such an instance, to provide better use of wireless resources, the allocation management resource allocates spectrum resources (channel, transmit power) among CBSDs (wireless stations) after accounting for ACI due to lack of frame synchronization or common TDD configuration. This can be achieved in any suitable manner.

More specifically, in one embodiment, the allocation management resource (or other suitable entity) generates a CBSD Interference Graph, which accounts for both adjacent channel interference and co-channel interference between each pair of wireless stations (e.g., CBSDs) in a manner as previously discussed. The allocation management resource determines connected sets of CBSDs based on the Interference Graph. Further, the allocation management resource uses graph coloring (or other suitable values) to determine the total number of colors (chromatic number) required, including any additional colors (corresponding to channels or carrier frequencies) needed to avoid occurrence of adjacent channel interference. In one embodiment, the allocation management resource allocates spectrum resources to CBSDs (wireless stations) in the connected set based on the chromatic number. The solution as described herein allows for adjacent channel coexistence and improved frequency reuse: i) amongst multiple GAA users, ii) across GAA and PAL users, and iii) among PAL users.

These and further embodiment are discussed below in more detail.

Note that any of the resources as discussed herein can include one or more computerized devices, wireless stations, communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, executable instructions, etc., that supports operations as discussed herein.

One embodiment includes a computer readable storage medium and/or system having instructions stored thereon to facilitate wireless communications in a network environment. The instructions, when executed by computer processor hardware, cause the computer processor hardware (such as one or more co-located or disparately processor devices) to: receive input indicating presence of a pair of wireless stations including a first wireless station and a second wireless station in a network environment; generate an adjacent channel interference value based on a determined amount of adjacent channel interference between the first wireless station and the second wireless station; and assign the adjacent channel interference value to the pair of wireless stations, the adjacent channel interference value indicating an estimate of adjacent channel interference between the first wireless station and the second wireless station.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of allocating portions of an available wireless spectrum in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
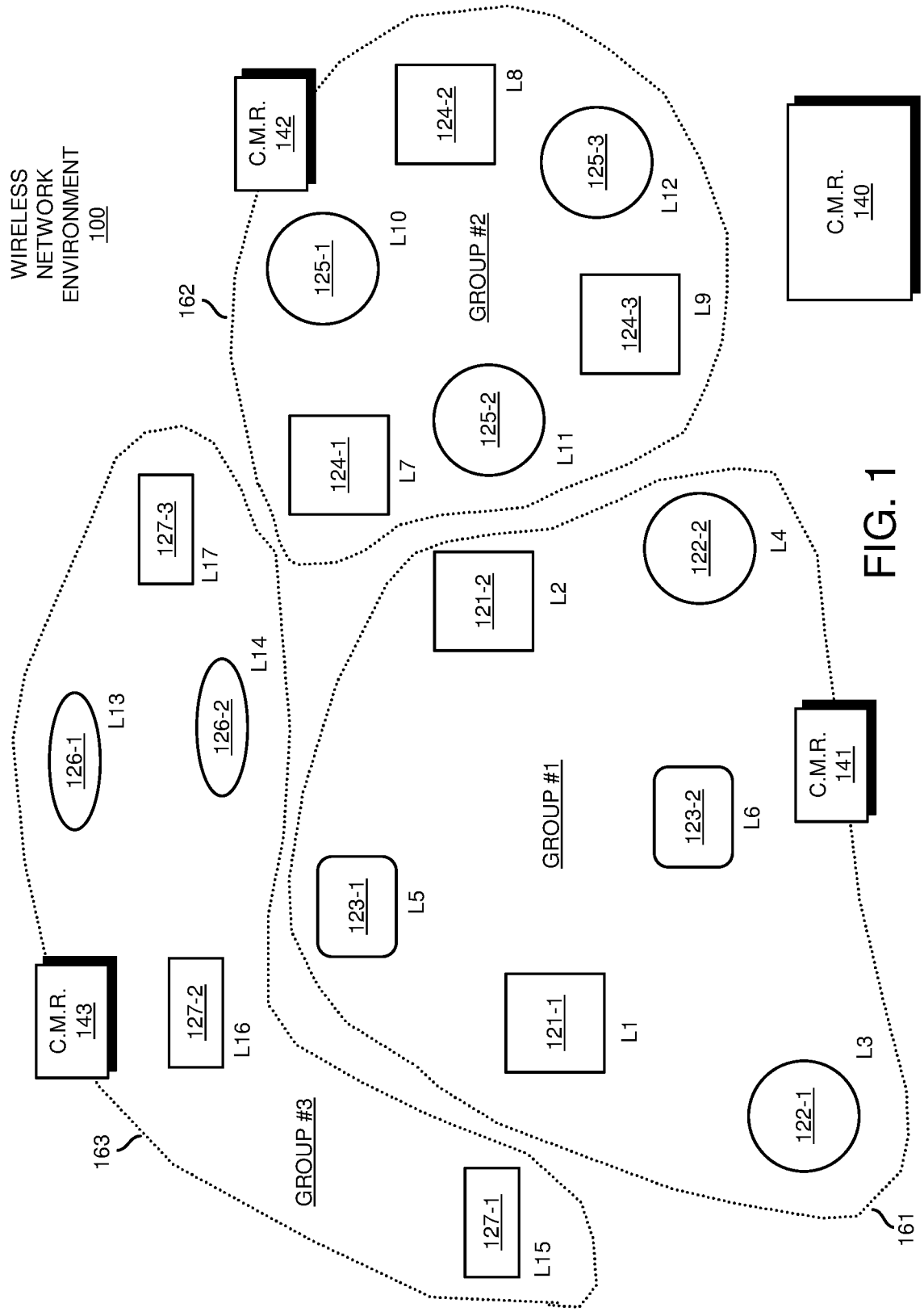
FIG. 1 is an example diagram illustrating groupings of multiple wireless access points according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include a communication management resource. The communication management resource receives input indicating presence of a pair of wireless stations including a first wireless station and a second wireless station in a network environment. Based on a determined amount of adjacent channel interference between the first wireless station and the second wireless station, the communication management resource generates an adjacent channel interference value. The communication management resource then assigns the adjacent channel interference value to the pair of wireless stations. In one configuration, the adjacent channel interference value indicates an estimate of adjacent channel interference and degree of adjacent channel interference susceptibility between the first wireless station and the second wireless station. The adjacent channel interference value is used as a basis to identify so-called edges in which corresponding pairs of wireless stations are susceptible to adjacent channel interference. For example, an allocation management resource uses the adjacent channel interference information associated with pairings of wireless stations to allocate wireless channels for use by those pairs of wireless stations.

Now, more specifically, FIG. 1 is an example diagram illustrating groupings of multiple wireless access points according to embodiments herein.

As shown in this example embodiment, network environment 100 includes a geographical region in which multiple wireless stations (such as wireless base stations, mobile communication devices, etc.) reside. The geographical region associated with network environment 100 is divided into multiple regions including region 161, region 162, and region 163. In one embodiment, the wireless stations represent wireless base stations in communication with respect to one or more mobile communication devices. The nearness of wireless stations in the geographical region makes the wireless stations susceptible to co-channel interference and adjacent channel interference as described herein.

As further shown, group #1 in region 161 includes wireless station 121-1 at location L1, wireless station 121-2 at location L2, wireless station 122-1 at location L3, wireless station 122-2 at location L4, wireless station 123-1 at location L5, and wireless station 123-2 at location L6.

Group #2 in region 162 includes wireless station 124-1 at location L7, wireless station 124-2 at location L8, wireless station 124-3 at location L9, wireless station 125-1 at location L10, wireless station 125-2 at location L11, and wireless station 125-3 at location L12.

Group #3 in region 163 includes wireless station 126-1 at location L13, wireless station 126-2 at location L14, wireless station 127-1 at location L15, wireless station 127-2 location L16, and wireless station 127-3 at location L17.

Different service providers control different sets of wireless stations. For example, in one embodiment, a first service provider operates wireless station 121-1 and wireless station 121-2. A second service provider operates wireless station 122-1 and wireless station 122-2. A third service provider operates wireless station 123-1 and wireless station 123-2.

A fourth service provider operates wireless station 124-1, wireless station 124-2, and wireless station 124-3. A fifth service provider operates wireless station 125-1, wireless station 125-2, and wireless station 125-3.

A sixth service provider operates wireless station 126-1 and wireless station 126-2. A seventh service provider operates wireless station 127-1, and wireless station 127-2, and wireless station 127-3.

In accordance with further embodiments, each of the service providers is allocated one or more wireless channels to communicate with a respective one or more mobile communication devices.

Note further that each of the groups include a respective communication management resource that allocates one or more wireless channels for use by the wireless stations.

For example, group #1 includes and is managed by communication management resource 141. The communication management resource 141 (such as a first spectrum access system or other suitable resource) allocates wireless channels for use by the wireless stations in group #1.

Group #2 includes and is managed by communication management resource 142 such as a second spectrum access system or other suitable resource. The communication management resource 142 allocates wireless channels for use by the wireless stations in group #2.

Group #3 includes and is managed by communication management resource 143 such as a third spectrum access system or other suitable resource. The communication management resource 143 allocates wireless channels for use by the wireless stations in group #3.

In accordance with further example embodiments, each of the communication management resources 141, 142, and 143 is a so-called spectrum access system that allocates CBRS channels for use by the respective wireless stations. Embodiments herein include coordinating allocation of wireless channels amongst the multiple wireless stations via the communication management resources 141, 142, and 143. The communication management resources are in communication with each other and coordinate allocation of wireless channels amongst the different wireless stations.

Figure 2:
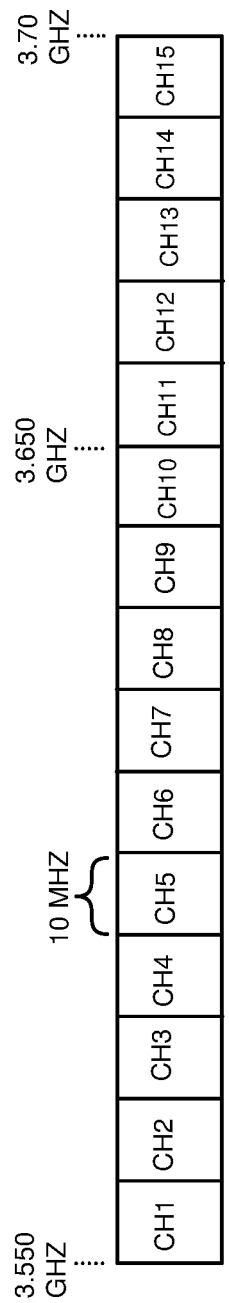
FIG. 2 is an example diagram illustrating availability of multiple adjacent wireless channels according to embodiments herein.

FIG. 2 is an example diagram illustrating availability of multiple adjacent wireless channels according to embodiments herein.

As previously discussed, the communication management resources 141, 142, and 143 can be configured to allocate any suitable wireless channels for use by the wireless stations present in the wireless network environment 100.

In one embodiment, the communication management resources allocate wireless channels from a CBRS band. Although embodiments herein include allocating wireless channels from any suitable wireless spectrum of shared wireless bandwidth.

In this example embodiment, the available pool of wireless channels includes channels (such as bandwidth partitions, sub-band portions, sub-band segments, etc.) wireless channels CH1, CH2, CH3, . . . CH15 associated with a CBRS band such as between 3.550 and 3.700 GHz bandwidth. In one embodiment, each channel supports 10 MHz bandwidth. In one embodiment, a portion of the wireless channels includes a guard band.

There are multiple different types of wireless channels in a conventional CBRS band. For example, portions of CBRS band (tiered hierarchy) include Priority Access License (PAL) wireless channels, General Authorized Access (GAA) wireless channels, or a combination of both. Highest priority is given to incumbent users (such as the government, next highest priority is given to (PAL) priority access licensed users. GAA users have the lowest priority.

In general, PAL wireless channels are licensed wireless channels in which a corresponding licensee (such as an entity paying for use of the wireless channel) is provided some protection of use of one or more allocated wireless channels in the CBRS band. For example, when no incumbent user (e.g., Government authority) requires use of the channels, the licensed entities are able to freely use the PAL wireless channels in respective one or more predetermined geographical regions without interference by other users (such as lower priority GAA users). General authorized access (GAA) users are able to use the band without a license when the wireless channels are available.

Subsequent to allocation, the wireless station assigned the one or more wireless channels uses the allocated channels to provide one or more communication devices access to a remote network such as the Internet.

In one embodiment, a portion of spectrum comprising 10 MHz channels are available in areas (such as counties) in the 3550-3650 MHz frequency range in the CBRS band. Up to 7 licenses will be awarded in each county. Each entity can buy rights for up to 4 licenses. The exact frequency range associated with a respective license is not guaranteed because it can change due to incumbent activity. In certain instances, a spectrum access system (SAS) will determine a primary and a secondary channel allocation for so-called PAL users.

Embodiments herein include the observation that it is desirable to determine an amount of co-channel interference as well as adjacent channel interference among each of the different wireless stations operating in the network environment 100. Use of the co-channel interference and/or adjacent channel interference associated with different pairings of wireless stations enables more efficient use of bandwidth. To this end, as further shown in FIG. 3, the communication management resource 140 determines the susceptibility of wireless interference (adjacent channel interference, co-channel interference, etc.) associated with simultaneous operation of the different wireless stations operating in the wireless network environment.

Figure 3:
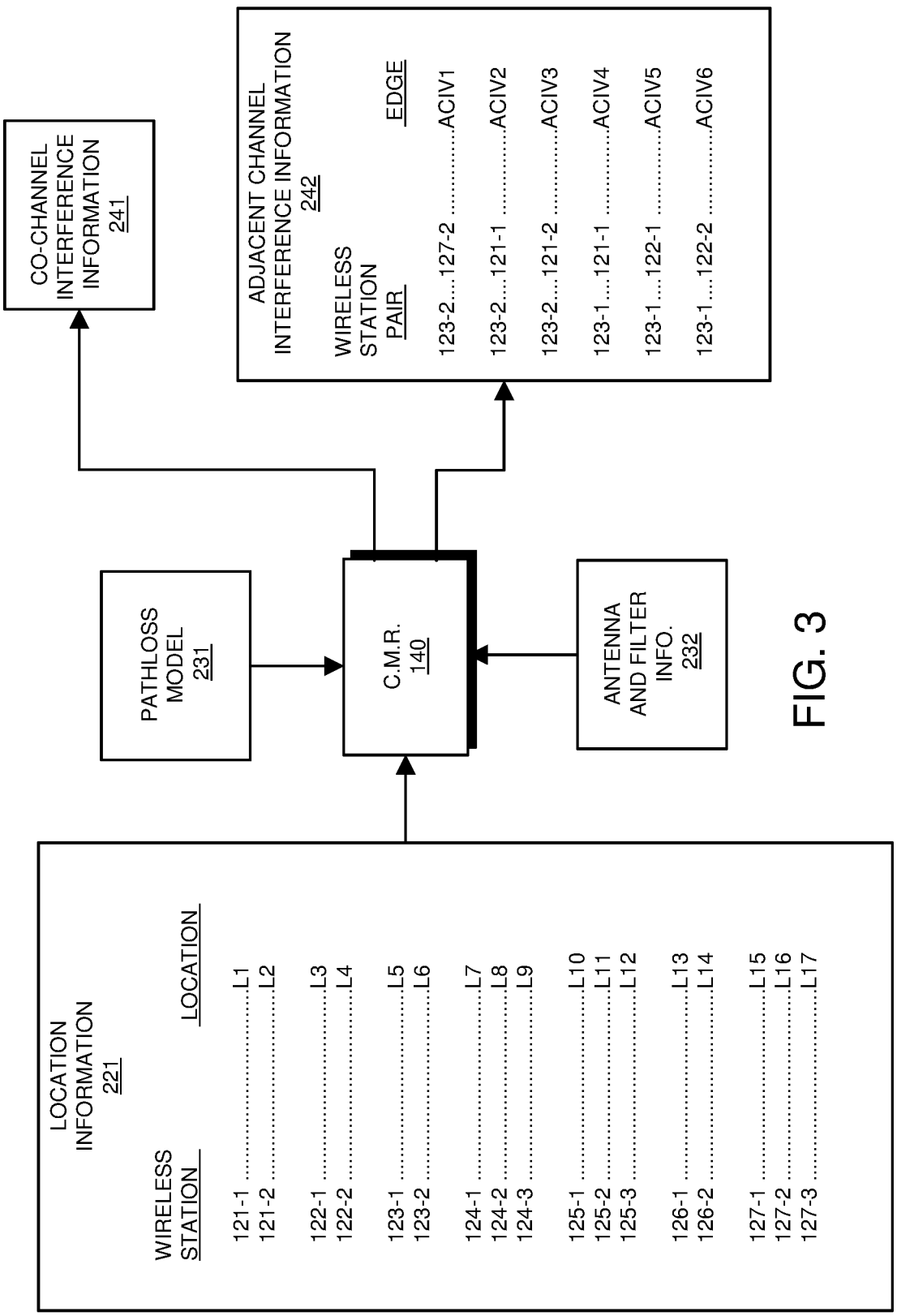
FIG. 3 is an example diagram illustrating generation of co-channel interference information and adjacent channel interference information for each of multiple pairings of wireless stations according to embodiments herein.

FIG. 3 is an example diagram illustrating generation of co-channel interference information and adjacent channel interference information for each of multiple pairings of wireless stations according to embodiments herein.

In this example embodiment, the communication management resource 140 receives location information 221 indicating a location of each of the wireless stations in the wireless network environment 100 as previously discussed in FIG. 1. The location information 221 indicates which pairings of wireless stations are susceptible to adjacent channel interference and adjacent channel interference based on distance of separation.

As further shown, the communication management resource 140 receives antenna information 232 associated with each of the wireless stations operating in the wireless network environment 100. Additionally, wireless network environment 100 implements a pathloss model 231 to determine wireless pathloss associated with communications in wireless network environment 100.

Via the pathloss model 231, antenna information 232, and/or other information, the communication management resource 140 generates co-channel interference information 241 and adjacent channel interference information 242 associated with each of the different pairs of wireless stations.

Note that the adjacent channel interference for pairs of wireless stations can be detected or determined in any suitable manner. For example, as previously discussed, the communication management resource 140 can be configured to implement or use one or more of an attenuation pathloss model, antenna model and filter characteristics associated with the wireless transmitter/receiver of each of the wireless stations, etc., to calculate the amount of adjacent channel interference between two wireless stations.

Additionally, or alternatively, the communication management resource 140 can be configured to use actual test/historical data indicating an amount of adjacent channel interference associated with the respective pair of wireless stations under test. Examples of testing the different pairs of wireless stations under test is shown and discussed in FIGS. 5-8.

Referring again to FIG. 3, assume in this example embodiment that the communication management resource 140 generates the adjacent channel interference information 242 to specify which pairs of wireless stations are most susceptible to adjacent channel interference. For example, in this example embodiment, based on analysis of adjacent channel interference associated with each of the possible pairs of wireless stations, the communication management resource 140 produces a so-called edge for pairs of wireless stations where the respective pair of wireless stations is susceptible above a threshold value to adjacent channel interference.

More specifically, based on analysis of location information 221, pathloss model 231, antenna information 232, etc., the communication management resource 140 determines that wireless communications by wireless station 123-2 and wireless station 127-2 are susceptible to mutual adjacent channel interference above a threshold value. In such an instance, the communication management resource 140 assigns a value of ACIV1 (adjacent channel interference value #1) to the corresponding pair 123-2 and 127-2. The value ACIV1 can indicate mere presence of an edge or a degree to which the respective pair of wireless stations is susceptible to adjacent channel interference.

Based on analysis of location information 221, pathloss model 231, antenna information 232, etc., the communication management resource 140 determines that wireless communications by wireless station 123-2 and wireless station 121-1 are susceptible to mutual adjacent channel interference above a threshold value. In such an instance, the communication management resource 140 assigns a value of ACIV2 (adjacent channel interference value #2) to the corresponding pair 123-2 and 121-1. The value ACIV2 can indicate mere presence of an edge or a degree to which the respective pair of wireless stations is susceptible to adjacent channel interference.

Based on analysis of location information 221, pathloss model 231, antenna information 232, etc., the communication management resource 140 determines that wireless communications by wireless station 123-2 and wireless station 121-2 are susceptible to mutual adjacent channel interference above a threshold value. In such an instance, the communication management resource 140 assigns a value of ACIV3 (adjacent channel interference value #3) to the corresponding pair 123-2 and 121-2. The value ACIV3 can indicate mere presence of an edge or a degree to which the respective pair of wireless stations is susceptible to adjacent channel interference.

Based on analysis of location information 221, pathloss model 231, antenna information 232, etc., the communication management resource 140 determines that wireless communications by wireless station 123-1 and wireless station 121-1 are susceptible to mutual adjacent channel interference above a threshold value. In such an instance, the communication management resource 140 assigns a value of ACIV4 (adjacent channel interference value #4) to the corresponding pair 123-1 and 121-1. The value ACIV4 can indicate mere presence of an edge or a degree to which the respective pair of wireless stations is susceptible to adjacent channel interference.

Based on analysis of location information 221, pathloss model 231, antenna information 232, etc., the communication management resource 140 determines that wireless communications by wireless station 123-1 and wireless station 122-1 are susceptible to mutual adjacent channel interference above a threshold value. In such an instance, the communication management resource 140 assigns a value of ACIV5 (adjacent channel interference value #5) to the corresponding pair 123-1 and 122-1. The value ACIV5 can indicate mere presence of an edge or a degree to which the respective pair of wireless stations is susceptible to adjacent channel interference.

Based on analysis of location information 221, pathloss model 231, antenna information 232, etc., the communication management resource 140 determines that wireless communications by wireless station 123-1 and wireless station 122-2 are susceptible to mutual adjacent channel interference above a threshold value. In such an instance, the communication management resource 140 assigns a value of ACIV6 (adjacent channel interference value #6) to the corresponding pair 123-1 and 121-1. The value ACIV6 can indicate mere presence of an edge or a degree to which the respective pair of wireless stations is susceptible to adjacent channel interference.

Figure 4:
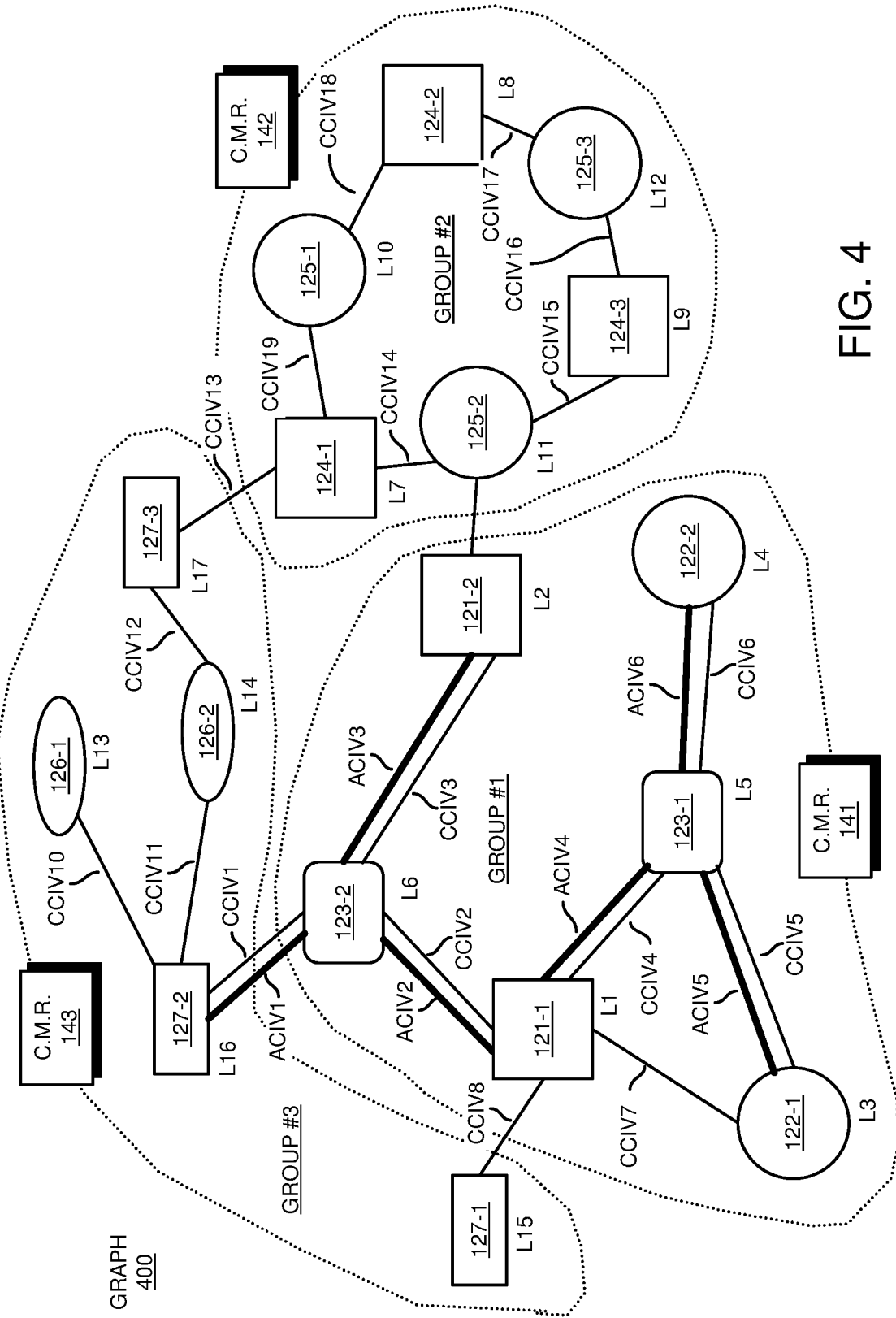
FIG. 4 is an example diagram illustrating assignment and display of a graph of co-channel interference and adjacent channel interference information to multiple pairings of wireless stations according to embodiments herein.

Additionally, the communication management resource 140 determines co-channel interference above a threshold value for the pairs of wireless stations as shown in FIG. 4. As further discussed below, the adjacent channel interference information 241 and the co-channel interference information 242 provides a basis in which to allocate wireless channels in the wireless network environment 100.

FIG. 4 is an example diagram illustrating generation of channel allocation information via channel selection information from multiple licensed entities according to embodiments herein.

As further discussed herein, embodiments herein include marking so-called adjacent channel interference edges (as specified by the adjacent channel interference information 242) between wireless station pairs in response to detecting that respective determined adjacent channel interference value associated with the pair of wireless stations is greater than a threshold value. Embodiments herein also include marking so-called co-channel interference edges between wireless station pairs in response to detecting that the co-channel interference value associated with the pair of wireless stations is greater than a threshold value.

More specifically, in one embodiment, based on the co-channel interference information 241 and adjacent channel interference information 242, the communication management resource 140 produces a graph 400 representative of the wireless network environment 100 and corresponding levels of interference for collective use by the communication management resources 141, 142, 143, etc., to efficiently allocate wireless channels.

As previously discussed, the adjacent channel interference values associated with the different pairs of wireless stations can be or include any numerical value indicating that communications associated with the pair of first wireless station and the second wireless station are susceptible to adjacent channel interference. In one embodiment, the numerical values indicate a degree of susceptibility. In such an instance, the degree of susceptibility is used as a basis to determine how far apart in frequency to space assignment of the different channels associated with the respective pair of wireless stations.

Via graph 400, as further discussed below, embodiments herein include being proactive about assigning wireless channels CH1, CH2, CH3, etc., to the wireless stations such that the adjacent channel interference (and co-channel interference) does not negatively impact such wireless communications between the collective set of wireless stations in each of the different regions.

Additional Description of Determining Adjacent Channel Interference

Computing of ACI edge weights between a pair of wireless stations.

In one embodiment, this is done for given channel bandwidths, frequency separation, and TDD configurations of CBSD-1 (i.e., a first wireless station under test) and CBSD-2 (i.e., a second wireless station under test) in a respective wireless station pair.

CBSD Coordination: If CBSD-1 requires CBSD time-division duplex coordination, estimate adjacent channel interference amount at CBSD-1 antenna port due to CBSD-2 radio transmission using propagation models as well as filter and antenna characteristics and spectrum emission mask (SEM) of CBSD-2. Create the interference metric for CBSD-1 (IM1) by transforming interference amount (I) in dBm to a value between 0 and 1 as follows:

$$IM = \begin{cases} \frac{I - I_{min}}{I_{max} - I_{min}}, & \text{if } I_{min} < I < I_{max} \\ 0, & \text{if } I \leq I_{min} \\ 1, & \text{if } I \geq I_{max} \end{cases}$$

where IM=Interference Metric, where $I_{min}$ and $I_{max}$ for a given CBSD are parameters determined by the managing SAS administrator or other suitable entity. A SAS administrator can use consistent values for $I_{min}$ and $I_{max}$ with other SASs or it can determine $I_{min}$ and $I_{max}$ suitable for different use cases as it prefers.

In one embodiment, if both wireless stations in the pair under support time-division duplex frame synchronization, then only UL (i.e., Uplink) subframes and UL special subframe symbols of CBSD-1 that overlap with DL (Downlink) subframes and DL special subframe symbols of CBSD-2 are considered in determining the adjacent channel interference metric. If any of the two CBSDs in the pair of wireless stations under test is not frame synchronized with respect to each other, then the most possible overlap of CBSD-1 uplink subframes and uplink symbols with CBSD-2 downlink subframes and downlink symbols may be assumed for worst-case impact. Alternatively, the average value of the overlap may be assumed for expected impact.

In one embodiment, note that the fraction of overlap of the transmission frames of the two CBSDs is multiplied with the value IM to determine the Interference Value for the respective wireless station pair under test:

$IV=X*IM$, where $X$ (a.k.a., a scale factor) is the fraction of overlap

Thus, embodiments herein include a communication management resource 140 that receives input indicating presence of a pair of wireless stations including a first wireless station under test and a second wireless station under test in a network environment. Based on a determined amount of adjacent channel interference between the first wireless station under test and the second wireless station under test, the communication management resource generates an adjacent channel interference value such as IV, IM, etc. The communication management resource 140 then assigns the adjacent channel interference value to the pair of wireless stations under test. In one embodiment, the adjacent channel interference value indicates or is based on an estimate of adjacent channel interference between the first wireless station and the second wireless station.

Yet further embodiments herein include, via the communication management resource 140, determining the amount of adjacent channel interference between the first wireless station under test and the second wireless station under test via operations of: via a model and other information, producing an adjacent channel interference metric (such as IM) representing anticipated adjacent channel interference between the first wireless station under test and the second wireless station under test in the pair; and multiplying the adjacent channel interference metric IM by a scale factor X, a magnitude of the scale factor X depending on an overlap of transmission frames associated with the first wireless station and the second wireless station.

EUD (End User Device) Coordination: If CBSD-1 requires EUD coordination: Estimate adjacent channel interference amount at EUD-1 antenna port due to EUD-2 radio transmission using propagation models as well as antenna and filter characteristics and spectrum emissions mask (SEM) of EUD-2. Create the interference metric for EUD-1 (IM1) by transforming interference amount (I) in dBm to a value between 0 and 1 as in CBSD coordination.

EUD-1 and EUD-2 locations are the closest or worst possible locations in the coverage of their respective CBSDs at nominal antenna heights (e.g. 1.5 meters for mobile user equipment, 6 meters for CPEs). In one embodiment, CBSD coverages are determined using propagation models based on a nominal value, such as −96 dBm.

If both CBSDs (wireless stations) under test are frame synchronized, then only downlink subframes and downlink special subframe symbols of CBSD-1 that overlap with uplink subframes and uplink special subframe symbols of CBSD-2 are considered in determining the interference metric. If any of the two CBSDs is not frame synchronized, then the most possible overlap of CBSD-1 downlink subframes and downlink symbols with CBSD-2 uplink subframes and uplink symbols may be assumed for worst-case impact. Alternatively, the expected value of the overlap may be assumed for expected impact CBSD-2's interference value (IV) is computed in the same manner as previously discussed If CBSD-1 indicates CBSD coordination, and CBSD-2 indicates EUD Coordination, IV1 (interference value for the first wireless station) is calculated assuming both CBSDs are using CBSD Coordination methodology. Also, IV2 (interference value for the second wireless station) is calculated assuming both CBSDs are using EUD Coordination Methodology.

The ACI Edge Weight ($EW_{ACI}$) between CBSD-1 and CBSD-2 is the maximum of IV1 and IV2.

A Common ACI Edge Weight ($CEW_{ACI}$) between two CBSDs is determined by the managing SAS(s) of the two CBSDs. If two CBSDs are managed by different SASs, the managing SASs of those CBSDs exchange their EW values for those CBSDs in order to create Edges consistently across SASs (a.k.a., communication management resources).

According to exchanged $EW_{ACI}$ values, each SAS calculates $CEW_{ACI}$ based on the following equation:

$$CEW_{ACI} = \frac{p_1 EW_{ACI,1} + p_2 EW_{ACI,2}}{p_1 + p_2}$$

Where $EW_{ACI,i}$ is ACI Edge Weight provided by SAS-i, $p_i$ is a positive weighting factor specific to SAS-i (½ by default).

If two CBSDs are managed by the same SAS, $CEW_{ACI}$ is equal to $EW_{ACI}$ computed by the managing SAS Determining of an adjacent channel interference edge between a pair of CBSDs An ACI edge is created between two CBSDs if the $CEW_{ACI}$ is greater than an Edge Threshold (ET), indicating adjacent channel interference susceptibility. The value of ET may be determined by the SAS Administrators based on operational considerations. Creation of an edge indicates that the wireless station pair under test is susceptible to adjacent channel interference.

In one embodiment, presence of an ACI edge between two CBSDs may be determined for various frequency separations (such as 5, 10, 15, 20, . . . MHz) and different possible channel bandwidths (5, 10, 15, 20, . . . MHz)

For each frequency separation, possibility of an ACI edge may be determined for the expected or worst case channel bandwidths for the two wireless stations (CBSDs). Thus, embodiments herein include assignment of the worst case adjacent channel interference value to the pair of wireless stations.

In one embodiment, an ACI edge may be marked between two respective wireless stations with the minimum possible frequency separation needed for adjacent channel operation. For example, if the pair of wireless stations is highly susceptible to adjacent channel interference, then a greater channel separation may be desired.

Figure 5:
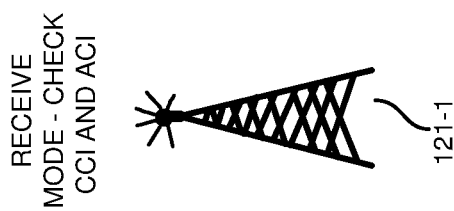
FIG. 5 is an example diagram illustrating a technique of determining adjacent channel interference associated with a pair of wireless base stations for first directional wireless communications according to embodiments herein.
Figure 5:
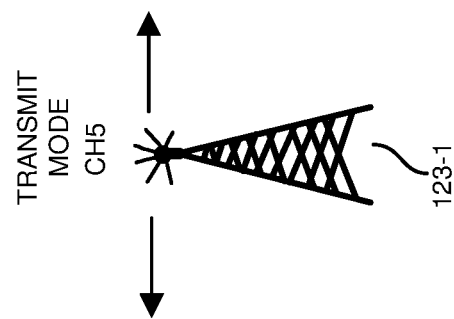

The minimum frequency separation may be marked as infinite if the value exceeds band limits No Edge is created among any pair of wireless stations (CBSDs) belonging to the same No Edge Group or Common Channel Group FIG. 5 is an example diagram illustrating generation of adjacent channel interference associated with a pair of wireless base stations for a first direction of wireless communications according to embodiments herein.

In this example embodiment, the communication management resource 140 determines co-channel interference and adjacent channel interference for the pair of wireless station under test such as wireless stations 123-1 (first wireless station under test) and wireless station 121-1 (second wireless station under test). Wireless station 123-1 operates in a transmit mode on a wireless channel (such as wireless channel #5) while wireless station 121-1 receives wireless communications over adjacent channel wireless channel 4 or wireless channel #6 or any other adjacent wireless channel other than wireless channel #5.

In a manner as previously discussed, the communication management resource 140 generates an adjacent channel interference metric and co-channel interference metric associated with pair of wireless stations 123-1 and wireless station 121-1.

Further, as previously discussed, the first wireless station under test and the second wireless station under test may be fully or partially frame synchronized. In one embodiment, the communication management resource 140, in response to detecting that the first wireless station under test and the second wireless station under test are frame-synchronized, determines/calculates the amount of adjacent channel interference between the first wireless station and the second wireless station based on downlink subframes and special subframe downlink symbols from the first wireless station that overlap with uplink subframes and special subframe uplink symbols of the second wireless station.

Figure 6:
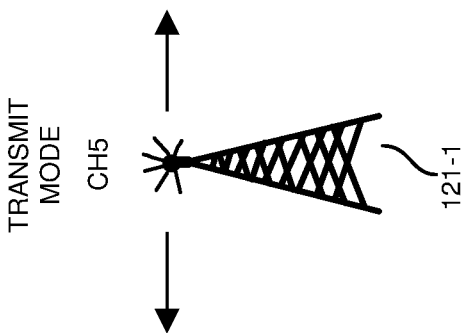
FIG. 6 is an example diagram illustrating generation of adjacent channel interference information associated with a pair of wireless base stations for second directional wireless communications according to embodiments herein.
Figure 6:
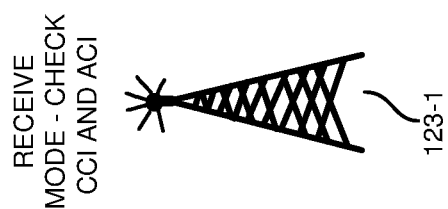

FIG. 6 is an example diagram illustrating generation of adjacent channel interference information associated with a pair of wireless base stations for a second direction of wireless communications according to embodiments herein.

In this example embodiment, the communication management resource 140 determines adjacent channel interference for the pair of wireless station under test such as wireless stations 123-1 (first wireless station under test) and wireless station 121-1 (second wireless station under test). Wireless station 121-1 operates in a transmit mode on a wireless channel (such as wireless channel #5) while wireless station 123-1 receives wireless communications over adjacent wireless channel 4 or wireless channel #6 or any other adjacent wireless channel other than wireless channel #5.

In a manner as previously discussed, the communication management resource 140 generates an adjacent channel interference metric associated with pair of wireless stations 123-1 and wireless station 121-1.

Further, as previously discussed, the first wireless station under test and the second wireless station under test may be frame synchronized. In one embodiment, the communication management resource 140, in response to detecting that the first wireless station under test and the second wireless station under test are frame-synchronized, calculates the amount of adjacent channel interference between the first wireless station and the second wireless station based on uplink subframes and special subframe uplink symbols from the first wireless station that overlap with downlink subframes and special subframe downlink symbols of the second wireless station.

In one nonlimiting example embodiment, the communication management resource 140 then combines the generated adjacent channel interference metrics to produce a single adjacent channel interference value associated with the pair of wireless stations. In this instance, the communication management resource 140 generates adjacent channel interference value ACIV4 associated with the pair of wireless stations 121-1 and wireless station 123-1. As previously discussed, the marking of the presence of the edge between wireless stations indicates that the corresponding pair of wireless stations is susceptible to adjacent channel interference. As further discussed below, the adjacent channel interference is used as a basis to decide what channels are assigned to the corresponding pair of wireless stations and other nearby wireless stations.

Thus, in one embodiment, the adjacent channel interference value is based on a combination of: i) first adjacent channel interference caused by the first wireless station under test wirelessly transmitting while the second wireless station under test is wirelessly receiving, and ii) second adjacent channel interference caused by the second wireless station under test wirelessly transmitting while the first wireless station under test is wirelessly receiving. In one embodiment, the adjacent channel interference value assigned to the pair of first wireless station and the second wireless station is set to the greater of the first adjacent channel interference and the second adjacent channel interference.

In a similar manner, the communication management resource 140 generates a respective adjacent channel interference value associated with each of the pairs of wireless stations under test to identify which wireless station pairs are susceptible to adjacent channel interference.

Figure 7:
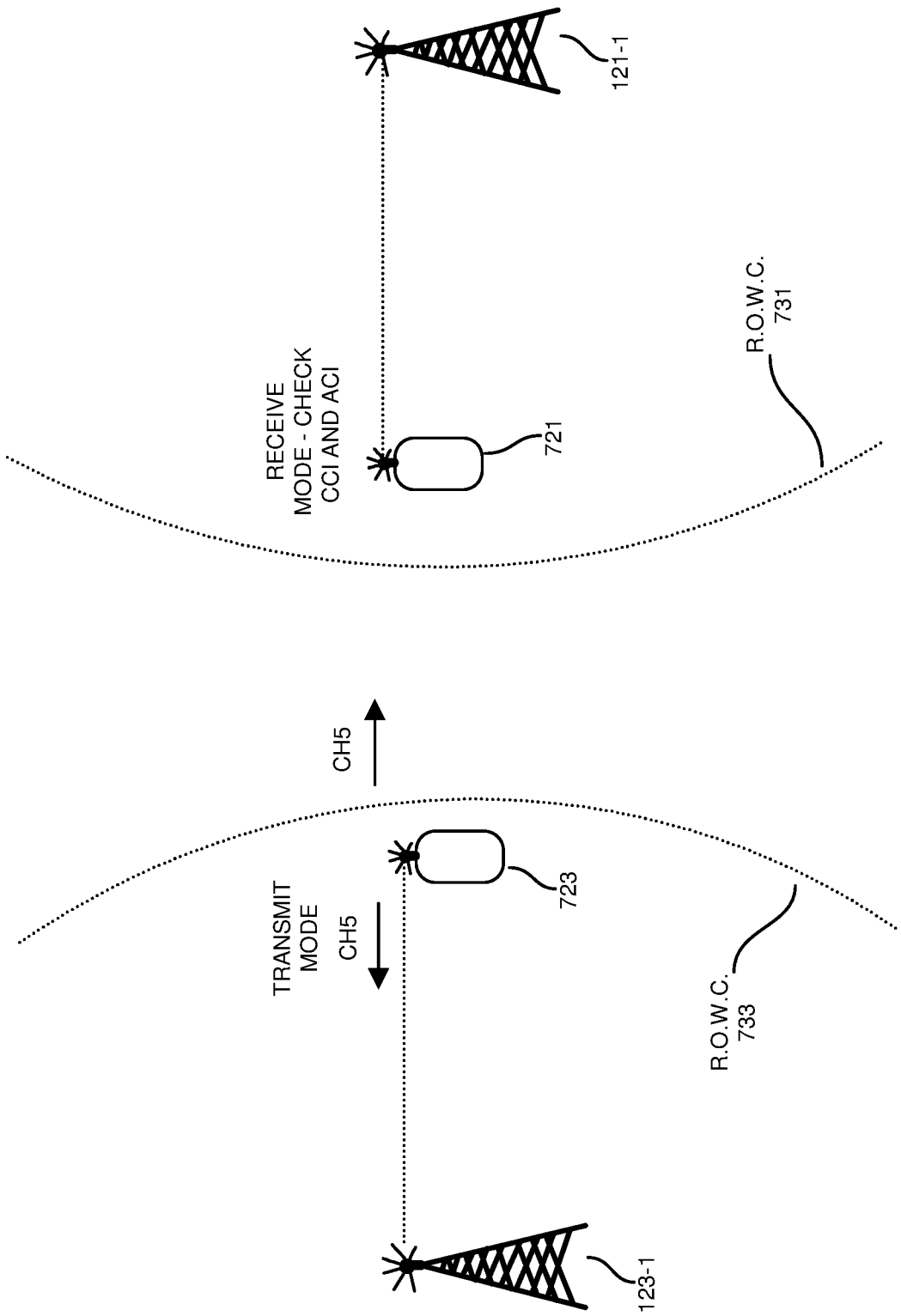
FIG. 7 is an example diagram illustrating generation of adjacent channel interference information associated with a pair of end-user devices for first directional wireless communications according to embodiments herein.

FIG. 7 is an example diagram illustrating generation of adjacent channel interference information associated with a pair of end-user devices for a first direction of wireless communications according to embodiments herein.

As previously discussed, wireless stations can be any suitable type of device. In one embodiment, the wireless stations under test are mobile communication devices in communication with a respective wireless base station.

In this example embodiment, the communication management resource 140 determines co-channel interference and adjacent channel interference for the pair of wireless stations under test such as wireless station 723 (such as a first mobile communication device under test) and wireless station 721 (such as a second mobile communication device under test). Wireless station 723 operates in a transmit mode on a wireless channel (such as wireless channel #5) while wireless station 721 receives wireless communications over adjacent channel wireless channel 4 or wireless channel #6 or any other adjacent wireless channel other than wireless channel #5.

In a manner as previously discussed, the communication management resource 140 generates an adjacent channel interference metric and co-channel interference metric associated with pair of wireless stations under test.

Figure 8:
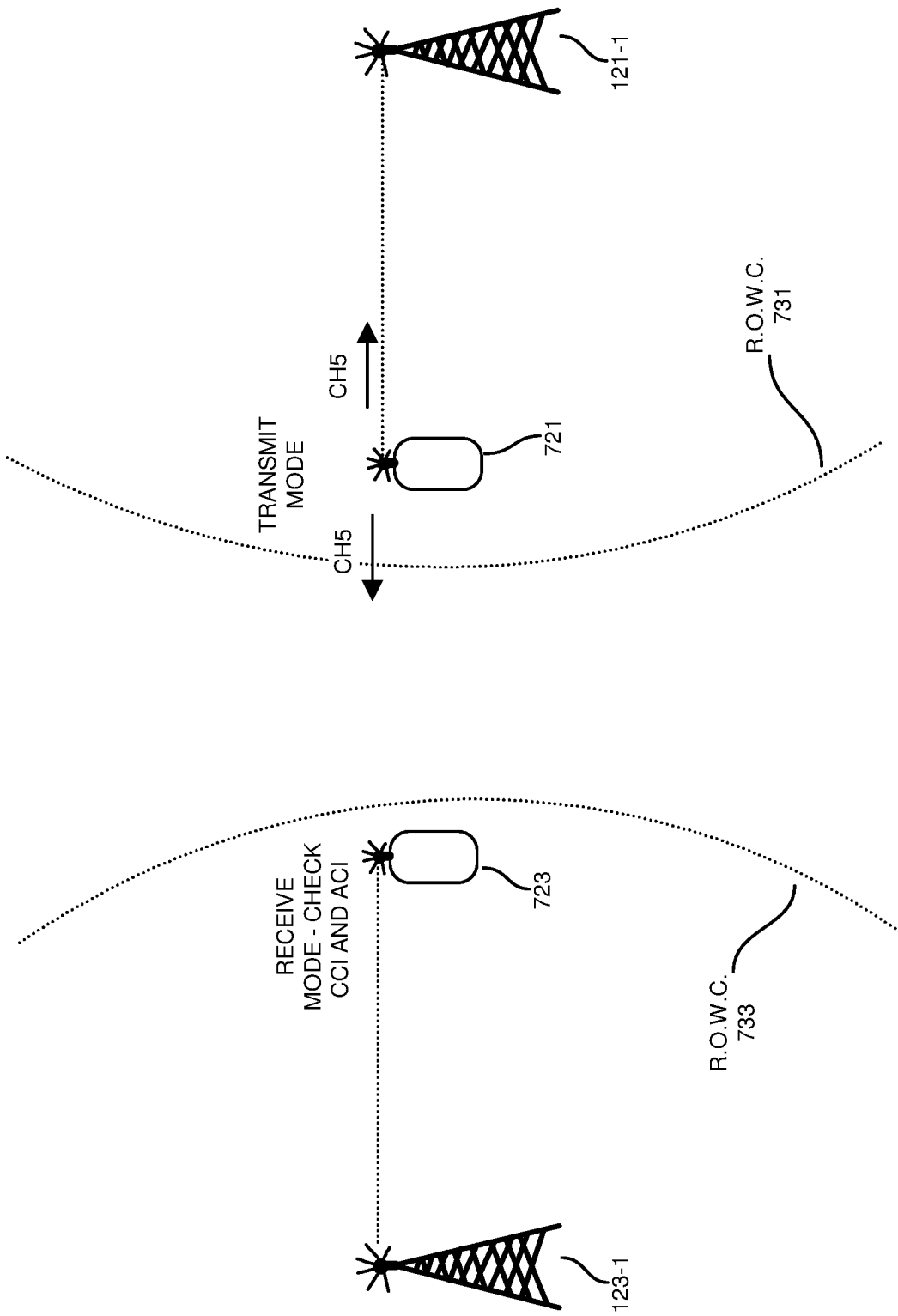
FIG. 8 is an example diagram illustrating generation of adjacent channel interference information associated with a pair of end-user device for second directional communications according to embodiments herein.

FIG. 8 is an example diagram illustrating generation of adjacent channel interference information associated with a pair of end-user device for a second direction of communications according to embodiments herein.

In this example embodiment, the communication management resource 140 determines co-channel interference and adjacent channel interference for the pair of wireless stations under test such as wireless station 723 (such as a first mobile communication device under test) and wireless station 721 (such as a second mobile communication device under test). Wireless station 721 operates in a transmit mode on a wireless channel (such as wireless channel #5) while wireless station 723 receives wireless communications over adjacent channel wireless channel 4 or wireless channel #6 or any other adjacent wireless channel other than wireless channel #5.

In a manner as previously discussed, the communication management resource 140 generates an adjacent channel interference metric and co-channel interference metric associated with the pair of wireless stations under test.

The communication management resource 140 then combines the generated adjacent channel interference metrics (from FIGS. 7 and 8) to produce a single adjacent channel interference value associated with the pair of wireless stations 721 and 723. As further discussed below, the adjacent channel interference is used as a basis to decide what channels are assigned to the corresponding pair of wireless stations and other nearby wireless stations.

Figure 9:
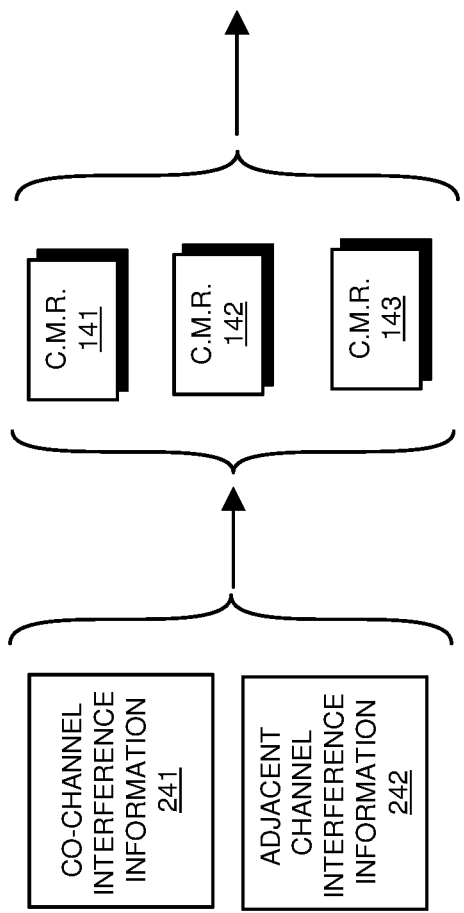
FIG. 9 is an example diagram illustrating use of channel interference information to allocate different carrier frequencies in a wireless network environment amongst multiple wireless stations according to embodiments herein.

FIG. 9 is an example diagram illustrating use of channel interference information to allocate a different carrier frequencies in a wireless network environment amongst multiple wireless stations according to embodiments herein.

In this example embodiment, the communication management resources (or other suitable entity) cooperate amongst each other to assign wireless channels for use by the wireless stations in the wireless network environment 100. For example, assume that each of the service providers associated with sets of wireless stations request a wireless channel (such as 10 MHz) from the CBRS band in which to support communications in the wireless network environment 100. A first service provider (such as a first GAA user) requests a wireless channel (such as a CBRS channel) in which to support wireless communications via wireless stations 121-1 and 121-2; a second service provider (such as a second GAA user) requests a wireless channel (such as a CBRS channel) in which to support wireless communications via wireless stations 122-1 and 122-2; a third service provider (such as a GAA user) requests a wireless channel (such as a CBRS channel) in which to support wireless communications via wireless stations 123-1 and 123-2; and so on.

In such an instance, based on the co-channel interference information 241 and adjacent channel interference information 242, the communication management resources 141, 142, 143, etc., (or other suitable entity) determines appropriate channel assignments to each of the wireless stations. For example, the communication management resources generate the frequency assignment information 921 in FIG. 9.

To avoid adjacent channel interference, the communication management resources (or other suitable entity) collectively operate to allocate appropriate channel spacings in view of the adjacent channel interference and co-channel interference associated with respective wireless station pairs. For example, it is known from the adjacent channel interference 242 that wireless station 123-2 is susceptible to adjacent channel interference via wireless stations 121-1, 121-2 and 127-2 and vice versa; wireless station 123-1 is susceptible to adjacent channel interference via wireless stations 121-1, 122-1, and 122-2 and vice versa.

To reduce effects of adjacent channel interference, the communication management resources collectively allocate frequency spacings to different service providers. For example, as indicated by the frequency assignment information 921, service provider #1 is assigned a first frequency CF1 (such as CH1) to operate wireless stations 121-1 and wireless station 121-2; service provider #2 is assigned a second frequency CF8 (such as CH8, spaced apart from CH1 by 60 MHz) to operate wireless stations 122-1 and wireless station 122-2; service provider #3 is assigned a third frequency CF4 (such as CH4, spaced apart from CH1 and CH8 by 20 MHz) to operate wireless stations 123-1 and wireless station 123-2; and so on. In such an instance, there is at least 20 MHz spacing (acting as a guard band against adjacent channel interference and co-channel interference) between channels assigned to each of service provider #1, service provider #2, and service provider #3, alleviating occurrence of adjacent channel interference.

In one embodiment, the carrier frequency CF2 (such as wireless channel CH2) is assigned to accommodate the frequency spacing, which serves as a guard band.

In certain instances, if the adjacent channel interference associated with a wireless station pair is relatively low but of concern, the communication management resources can be configured to space the channels apart by 5 or 10 MHz (or any suitable amount) instead of 20 MHz.

Figure 10:
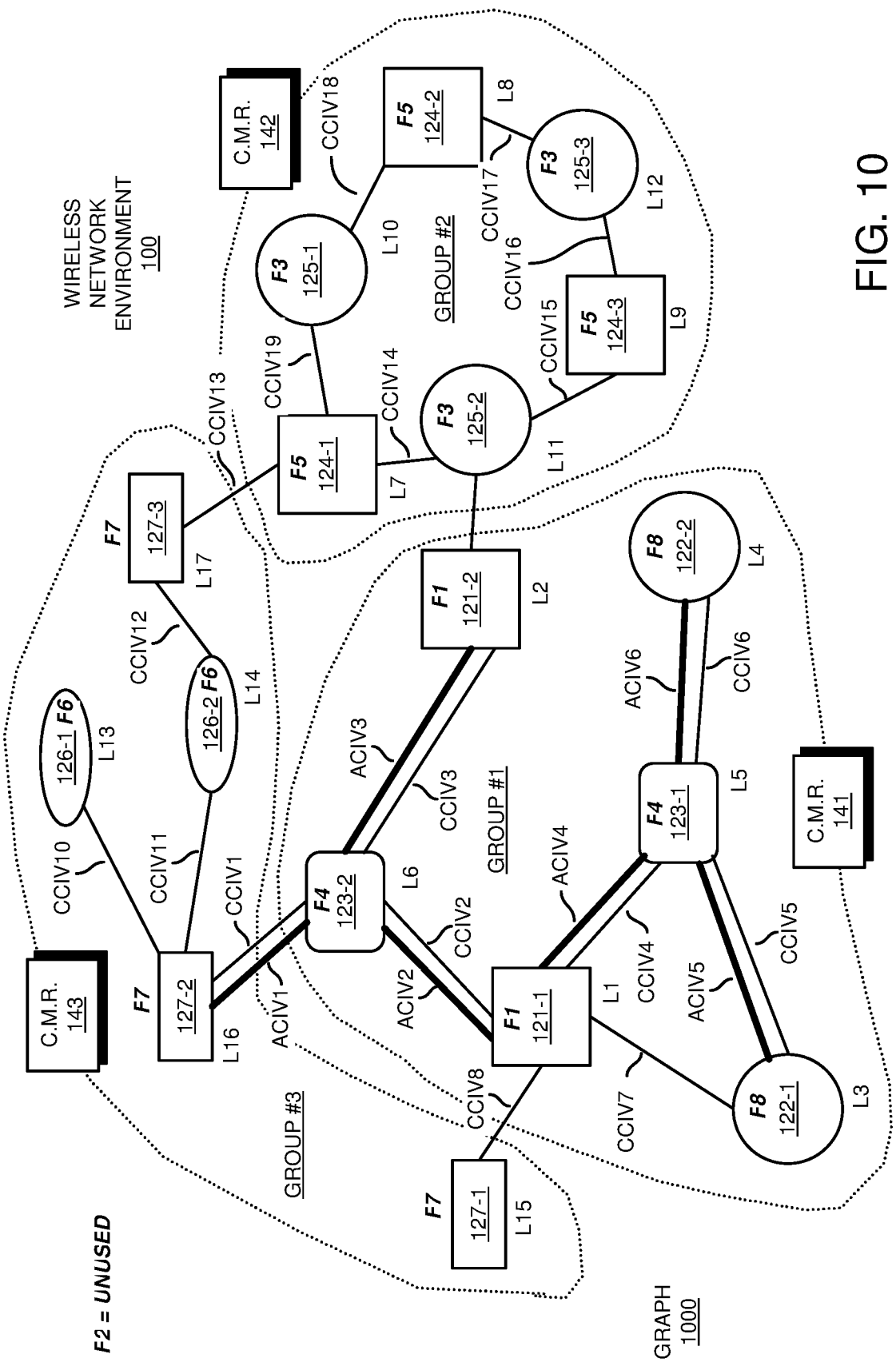
FIG. 10 is an example graph diagram illustrating implementation of the different frequency assignments according to embodiments herein.

FIG. 10 is an example diagram illustrating use of the different frequency assignments according to embodiments herein.

In this example embodiment, assume that each of the wireless stations uses different TDD configurations with respect to all other wireless stations, resulting in 20 MHz minimum frequency separation from adjoining CBSDs. Frequency allocation requires one additional color (and corresponding supplemental wireless channel, i.e. G=1).

The following is a description of generating the graph 1000 based on generation of frequency assignment information 921.

Generation of Interference Graph

Mark regular and ACI edges along with the minimum frequency separation between CBSDs in an Interference Graph 1000.

Connected Set

Determine Connected Sets of CBSDs such that:
   Any two CBSDs in a Connected Set are connected directly with an Edge or indirectly through other CBSDs in the CBSD interference graph, and
   No CBSD within the Connected Set is connected directly or indirectly to any CBSD outside of the Connected Set.

Graph Coloring

Graph coloring is performed by identifying and coloring each CxG subgraph within the Connected Set. A CxG subgraph is a subset of the CBSD Interference Graph where all CBSDs belong to a specific Coexistence Group (CxG) in the Connected Set
   The number of colors (Chromatic Number C_i) for each CxG subgraph is determined
   Any additional colors needed due to minimum frequency separation along ACI edges is determined
   The total Chromatic Number (C) is calculated as the sum of the Chromatic Numbers for all CxG subgraphs plus the total number of any additional colors required for frequency separation (guard bands)

Spectrum resources are assigned such that they are orthogonal, to the extent possible, among CxGs and the guard bands required to maintain minimum frequency separation are minimized The initial spectrum assignment to each CxG in the Connected Set is determined per following guidelines:
   If the maximum allocable bandwidth in the Connected Set is B, the bandwidth allocated to the i-th CxG, (denoted by $BW_i$), is given by:

$$BW_i = C_i \times [B/C], \text{ where } C = \Sigma_i C_i + G,$$

Bandwidth Expansion
   Each CBSD can be given additional spectrum resources as long as they are orthogonal to the resources given to CBSDs with which it has edges, including ACI edges.

Colored Interference Graph of Wireless Stations (CBSDs)
   C1=number of wireless channels (i.e., 3) needed for group #1; C2=number of wireless channels (i.e., 2) needed for group #2; C3=number of wireless channels (i.e. 2) needed for group #3.
      Total Chromatic/Channel Number: G=1, C=C1+C2+C3+G=8 channels
      Total available GAA BW: B=80 MHz
      Assigned Frequencies per frequency assignment information 921 (10 MHz per channel—allocation of 8 channels CH1, CH2, CH3, CH4, CH5, CH6, CH7, and CH8):
      Initial available GAA BW:
      CxG1: BW1=30 MHz (CH1, CH4, and CH8), 20 MHz spacing
      CxG2: BW2=20 MHz (CH3 and CH5), 10 MHz spacing
      CxG3: BW3=20 MHz (CH6 and CH7), no spacing because no adjacent channel interference Thus, embodiments herein include, via the communication management resource (such as any of 141, 142, 143, etc.), selecting allocation of wireless channels to a first wireless station and a second wireless station based on an amount of the adjacent channel interference value associated with the pair. The communication management resource chooses a frequency spacing between the wireless station pairs based on the adjacent channel interference value. In one embodiment, as described herein, implementation of the channel spacing to susceptible wireless stations acts as a guard band between the wireless channels allocated to the different wireless stations.

In accordance with further example embodiments, such as in the following example of allocating wireless channels to the wireless stations in graph 400 or graph 1000, when allocating one or more wireless channels to the wireless stations, the communication management resource: determines a bandwidth spacing value associated with a respective adjacent channel interference value; selects a first wireless channel and a second wireless channel in response to detecting that the first wireless channel and the second wireless channel are spaced apart by more than the determined frequency spacing; allocates the first wireless channel for use by the first wireless station; and allocates the second wireless channel for use by the second wireless station.

Further Embodiments

Spectrum allocation can be optimized for a set of wireless stations (such as CBSDs) by comparing allocation for multiple choices for TDD configurations and choosing the one that satisfies a given metric, such as total available bandwidth for uplink or downlink.

Coexistence groups using different TDD configurations can be combined to form a single coexistence group, thus providing higher spectrum use.

PAL channel assignment and coexistence between PAL and GAA users may be improved by considering ACI impact.

Actual CBSD SEM may be used instead of FCC required SEM.

CBSDs may use different technologies with different subcarrier spacings.

Figure 11:
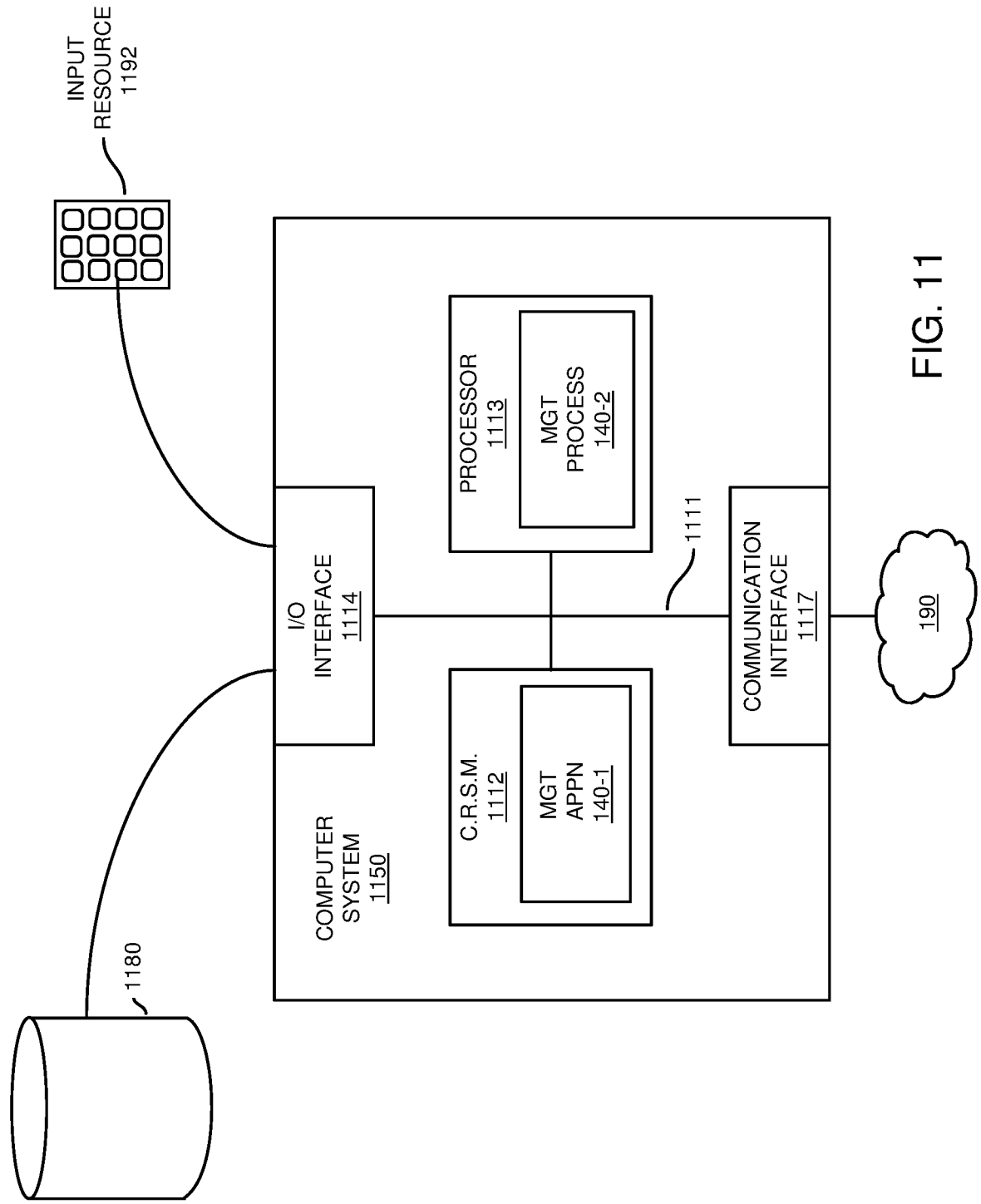
FIG. 11 is a diagram illustrating example computer architecture to execute one or more operations according to embodiments herein.

FIG. 11 is an example block diagram of a computer system for implementing any of the operations as previously discussed according to embodiments herein.

Any of the resources (such as communication management resource 140, communication management resource 141, communication management resource 142, communication management resource 143, allocation management resource 940, etc.) as discussed herein can be configured to include computer processor hardware and/or corresponding executable instructions to carry out the different operations as discussed herein.

As shown, computer system 1150 of the present example includes an interconnect 1111 that couples computer readable storage media 1112 such as a non-transitory type of media (which can be any suitable type of hardware storage medium in which digital information can be stored and retrieved), a processor 1113 (computer processor hardware), I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with management application 140-1 (e.g., including instructions associated with one or more of communication management resource 140, communication management resource 141, communication management resource 142, communication management resource 143, allocation management resource 940, etc.) to carry out any of the operations as discussed herein.

During operation of one embodiment, processor 1113 accesses computer readable storage media 1112 via the use of interconnect 1111 in order to launch, run, execute, interpret or otherwise perform the instructions in management application 140-1 stored on computer readable storage medium 1112. Execution of the management application 140-1 produces management process 140-2 to carry out any of the operations and/or processes as discussed herein.

Those skilled in the art will understand that the computer system 1150 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by the different resources will now be discussed via flowcharts in FIG. 12. Note that the steps in the flowcharts below can be executed in any suitable order.

Figure 12:
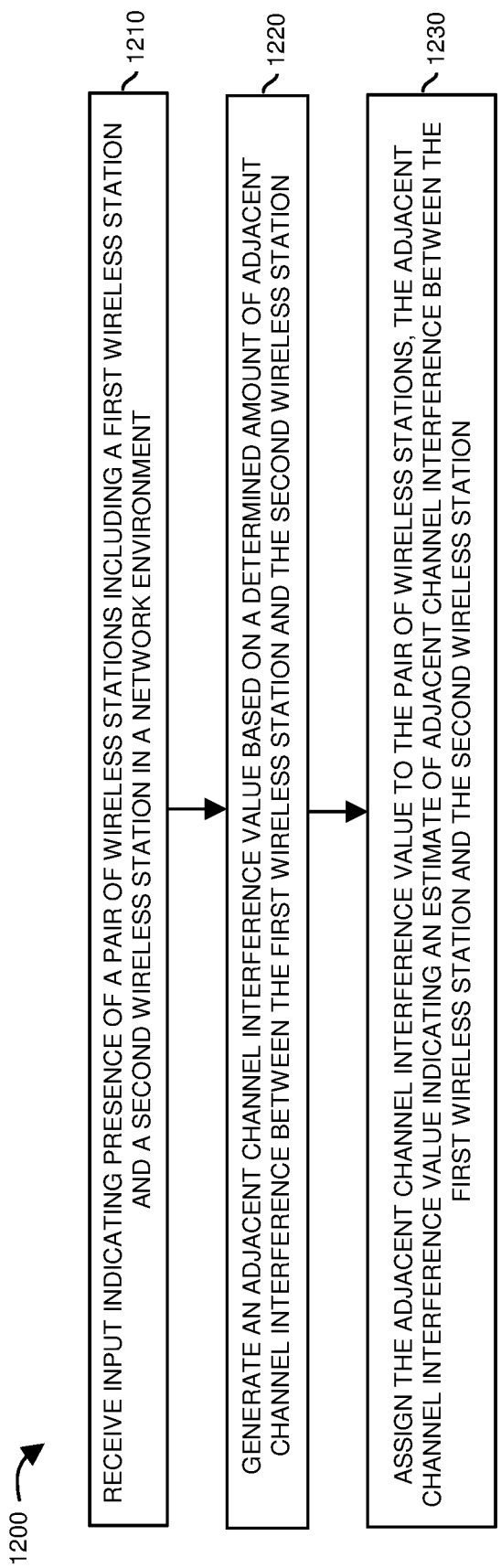
FIG. 12 is an example diagram illustrating a method according to embodiments herein.

FIG. 12 is a flowchart 1200 illustrating an example method according to embodiments. Note that there will be some overlap with respect to concepts as discussed above.

In processing operation 1210, the communication management resource 140 receives input such as wireless station location information 221 indicating presence of multiple pairs of wireless stations including a first wireless station and a second wireless station in a network environment 100.

In processing operation 1220, the communication management resource 140 generates an adjacent channel interference value based on a determined amount of adjacent channel interference between the first wireless station and the second wireless station.

In processing operation 1230, the communication management resource 140 assigns the adjacent channel interference value to the pair of wireless stations. In one embodiment, the adjacent channel interference value indicates an estimate of adjacent channel interference between the first wireless station and the second wireless station.

As previously discussed, the communication management resource 140 repeats the process of generating the co-channel interference and adjacent channel interference information for each pair of wireless stations and uses such information as a basis to allocate wireless channels in a wireless network environment 100.

Note again that techniques herein are well suited to facilitate fair and desirable assignment of wireless channels in view of occurrence of adjacent channel interference in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   determining first adjacent channel interference caused by a first wireless station wirelessly transmitting while a second wireless station is wirelessly receiving;

wherein the first wireless station wirelessly transmitting while the second wireless station is wirelessly receiving includes the first wireless station wirelessly transmitting over a first wireless channel and the second wireless station wirelessly receiving over an adjacent channel with respect to the first wireless channel;

determining second adjacent channel interference caused by the second wireless station wirelessly transmitting while the first wireless station is wirelessly receiving;

wherein the second wireless station wirelessly transmitting while the first wireless station is wirelessly receiving includes the second wireless station wirelessly transmitting over the first wireless channel and the second wireless station wirelessly receiving over an adjacent channel with respect to the first wireless channel; and allocating wireless channels for use by the first wireless station and the second wireless station based on an adjacent channel interference value derived from the determined first adjacent channel interference and the determined second adjacent channel interference.

2. The method as in claim 1, wherein the first wireless station is a first mobile communication device in wireless communication with a first wireless base station; and
wherein the second wireless station is a second mobile communication device in wireless communication with a second wireless base station.

3. The method as in claim 1 further comprising:
assigning the wireless channels to the first wireless station and the second wireless station such that the adjacent channel interference associated with use of the wireless channels does not negatively impact wireless communications associated with the first wireless station and the second wireless station.

4. The method as in claim 1, wherein assigning the wireless channels to the first wireless station and the second wireless station includes:
choosing a frequency spacing between a first wireless channel assigned to the first wireless station and a second wireless channel assigned to the second wireless station based on the adjacent channel interference value.

5. The method as in claim 1 further comprising:
determining that the first wireless station and the second wireless station are susceptible to adjacent channel interference from each other based on a nearness of the first wireless station to the second wireless station.

6. The method as in claim 1, wherein a magnitude of the adjacent channel interference value depends on an overlap of transmission frames associated with the first wireless station and the second wireless station.

7. The method as in claim 1, wherein the adjacent channel interference value is set to a greater of the first adjacent channel interference and the second adjacent channel interference.

8. The method as in claim 1 further comprising:
determining a distance between the first wireless station and the second wireless station; and
determining the amount of adjacent channel interference based on the distance.

9. The method as in claim 1, wherein the first wireless station is a first wireless base station in wireless communication with a first mobile communication device; and
wherein the second wireless station is a second wireless base station in wireless communication with a second mobile communication device.

10. The method as in claim 1 further comprising:
determining the first adjacent channel interference based on the first wireless station wirelessly transmitting communications to a third wireless station while the second wireless station is receiving wireless signals from a fourth wireless station.

11. The method as in claim 1, wherein the adjacent channel interference value is set to the determined first adjacent channel interference in response to detecting that the first adjacent channel interference is greater than the second adjacent channel interference.

12. The method as in claim 1 further comprising:
receiving location information indicating a location of the first wireless station and a location of the second wireless station;
determining a pathloss in a vicinity of the first wireless station and the second wireless station; and
determining the amount of the first adjacent channel interference based on distance and the determined pathloss.

13. The method as in claim 1 further comprising:
producing the adjacent channel interference value based at least in part on how many uplink subframe communications associated with the first wireless station overlap with downlink subframe communications associated with the second wireless station.

14. The method as in claim 13, wherein communications to/from the first wireless station and the second wireless station are frame synchronized with respect to a common time-division duplex configuration implemented by both the first wireless station and the second wireless station.

15. The method as in claim 1 further comprising:
producing the adjacent channel interference value to indicate a degree to which the first wireless station and the second wireless station are susceptible to adjacent channel interference with respect to each other.

16. The method as in claim 1 further comprising:
producing the adjacent channel interference value based on a scale factor, a magnitude of the scale factor depending on an overlap of transmission frames associated with the first wireless station and the second wireless station.

17. The method as in claim 1 further comprising:
receiving location information indicating a location of the first wireless station and a location of the second wireless station; and
utilizing the location information to derive the adjacent channel interference value.

18. The method as in claim 1 further comprising:
generating the adjacent channel interference value based on a first attenuation of first wireless signals transmitted from the first wireless station and a second attenuation of second wireless signals transmitted from the second wireless station.

19. The method as in claim 1 further comprising:
determining a distance between the first wireless station and the second wireless station;
determining an attenuation associated with first wireless signals transmitted from the first wireless station and second wireless signals transmitted from the second wireless station; and
determining the first adjacent channel interference and the second adjacent channel interference based on the distance and the determined attenuation.

20. A system comprising:
communication management hardware operable to:
   determine first adjacent channel interference caused by a first wireless station wirelessly transmitting while a second wireless station is wirelessly receiving;
   wherein the first wireless station wirelessly transmitting while the second wireless station is wirelessly receiving includes the first wireless station transmitting over a first wireless channel and the second wireless station receiving over an adjacent channel with respect to the first wireless channel;
   determine second adjacent channel interference caused by the second wireless station wirelessly transmitting while the first wireless station is wirelessly receiving;
   wherein the second wireless station wirelessly transmitting while the first wireless station is wirelessly receiving includes the second wireless station transmitting over the first wireless channel and the second wireless station receiving over an adjacent channel with respect to the first wireless channel; and
   allocate wireless channels for use by the first wireless station and the second wireless station based on an adjacent channel interference value derived from the determined first adjacent channel interference and the determined second adjacent channel interference.

21. The system as in claim 20, wherein the first wireless station is a first mobile communication device in wireless communication with a first wireless base station; and
   wherein the second wireless station is a second mobile communication device in wireless communication with a second wireless base station.

22. The system as in claim 20, wherein the communication management hardware is further operative to:
   choose a frequency spacing between a first wireless channel assigned to the first wireless station and a second wireless channel assigned to the second wireless station based on the adjacent channel interference value.

23. The system as in claim 20, wherein a magnitude of the adjacent channel interference value depends on an overlap of transmission frames associated with the first wireless station and the second wireless station.

24. The system as in claim 20, wherein the communication management hardware is further operative to:
   determine a distance between the first wireless station and the second wireless station; and
   determine the amount of adjacent channel interference based on the distance.

25. A method comprising:
   determining first adjacent channel interference caused by a first wireless station wirelessly transmitting while a second wireless station is wirelessly receiving;
   determining second adjacent channel interference caused by the second wireless station wirelessly transmitting while the first wireless station is wirelessly receiving;
   in response to detecting that the first wireless station and the second wireless station are frame-synchronized, calculating an adjacent channel interference value based on; i) how many subframes used by the first wireless station and the second wireless station overlap with each other, and ii) the determined first adjacent channel interference and the determined second adjacent channel interference; and
   allocating wireless channels for use by the first wireless station and the second wireless station based on the adjacent channel interference value.

26. A system comprising:
communication management hardware operative to:
   determine first adjacent channel interference caused by a first wireless station wirelessly transmitting while a second wireless station is wirelessly receiving;
   determine second adjacent channel interference caused by the second wireless station wirelessly transmitting while the first wireless station is wirelessly receiving; and
   allocate wireless channels for use by the first wireless station and the second wireless station based on an adjacent channel interference value derived from the determined first adjacent channel interference and the determined second adjacent channel interference; and
   wherein the communication management hardware is further operative to: in response to detecting that the first wireless station and the second wireless station are frame-synchronized, calculate the adjacent channel interference value based on how many subframes used by the first wireless station and the second wireless station overlap with each other.

27. A method comprising:
determining first adjacent channel interference caused by a first wireless station wirelessly transmitting while a second wireless station is wirelessly receiving;
determining second adjacent channel interference caused by the second wireless station wirelessly transmitting while the first wireless station is wirelessly receiving;
allocating wireless channels for use by the first wireless station and the second wireless station based on an adjacent channel interference value derived from the determined first adjacent channel interference and the determined second adjacent channel interference;
wherein allocating the wireless channels includes: deriving a frequency spacing value associated with the wireless channels based on the adjacent channel interference value; and selecting wireless channel assignments including assignment of a first wireless channel of the wireless channels to the first wireless station and assignment of a second wireless channel of the wireless channels to the second wireless station, the first wireless channel and the second wireless channel being spaced apart in frequency depending on the derived frequency spacing value.

* * * * *

UNITED STATES PATENT AND TRADEMARK OFFICE
CERTIFICATE OF CORRECTION

| | | |
|---|---|---|
| PATENT NO. | : 12,213,118 B2 | Page 1 of 1 |
| APPLICATION NO. | : 18/143347 | |
| DATED | : January 28, 2025 | |
| INVENTOR(S) | : Abdulrauf Hafeez | |

It is certified that error appears in the above-identified patent and that said Letters Patent is hereby corrected as shown below:

In the Claims

Claim 25, Line 11, replace ";" with --:--

Signed and Sealed this
Twenty-ninth Day of April, 2025

Coke Morgan Stewart
*Acting Director of the United States Patent and Trademark Office*